(12) United States Patent
Neuweg et al.

(10) Patent No.: US 11,244,256 B2
(45) Date of Patent: *Feb. 8, 2022

(54) SYSTEM AND METHOD FOR ENHANCING CREDIT AND DEBT COLLECTION

(71) Applicant: Neu IP, LLC, Kansas City, MO (US)

(72) Inventors: Ryan A. Neuweg, Kansas City, MO (US); David E. Bauer, Bailey, CO (US); José Eduardo Bastos Dos Santos, Shawnee, KS (US)

(73) Assignee: Neu IP, LLC, Kansas City, MO (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/442,761

(22) Filed: Jun. 17, 2019

(65) Prior Publication Data

US 2019/0318293 A1 Oct. 17, 2019

Related U.S. Application Data

(63) Continuation of application No. 14/588,035, filed on Dec. 31, 2014, now Pat. No. 10,325,227, which is a (Continued)

(51) Int. Cl.
*G06Q 10/06* (2012.01)
*G06Q 40/02* (2012.01)
*G06Q 40/00* (2012.01)

(52) U.S. Cl.
CPC ... *G06Q 10/063112* (2013.01); *G06Q 10/067* (2013.01); *G06Q 10/0635* (2013.01);
(Continued)

(58) Field of Classification Search
USPC ........................................... 705/7.38
See application file for complete search history.

(56) References Cited

U.S. PATENT DOCUMENTS

| | | | |
|---|---|---|---|
| 7,191,150 B1 * | 3/2007 | Shao | G06Q 10/06312 705/38 |
| 7,686,214 B1 | 3/2010 | Shao et al. | |

(Continued)

OTHER PUBLICATIONS

Developing and implementing an effective collections strategy Retail Banker International, London ed.: 10-12. Lafferty Ltd. (Dec. 2004) available at https://dialog.proquest.com/professional/docview/200169591?accountid=131444 (Year: 2004).*

*Primary Examiner* — Folashade Anderson
(74) *Attorney, Agent, or Firm* — Erise IP, P.A.

(57) ABSTRACT

A system and method for enhancing assignment of debtor accounts to a plurality of collection parties is presented. The preferred embodiment is capable of optimizing the way by which individual performance entities are assigned to collect on actionable individual debtor accounts by a creditor. An analysis solution uses algorithms to analyze gathered data and to provide a score to each collection party based upon the traits of the individual collection parties, debtor accounts, creditor, externally acquired data, and constraints upon all of the parties involved. The system and method are also capable of enhancing an individual borrower's credit score depending on the risk involved with providing credit to that particular borrower based upon the collectability upon default. One embodiment of the invention would include a risk analysis and compliance assessment system for supply entities to evaluate potential performance entities or other entities.

20 Claims, 12 Drawing Sheets

Related U.S. Application Data continuation-in-part of application No. 14/145,536, filed on Dec. 31, 2013, now abandoned, which is a continuation-in-part of application No. 12/819,913, filed on Jun. 21, 2010, now Pat. No. 8,620,725.

(60) Provisional application No. 61/218,743, filed on Jun. 19, 2009.

(52) U.S. Cl.
CPC ... *G06Q 10/0637* (2013.01); *G06Q 10/06393* (2013.01); *G06Q 40/00* (2013.01); *G06Q 40/02* (2013.01); *G06Q 40/025* (2013.01)

(56) References Cited

U.S. PATENT DOCUMENTS

| | | | |
|---|---|---|---|
| 2007/0043661 A1* | 2/2007 | Kass | G06Q 40/04 705/38 |
| 2013/0226756 A1* | 8/2013 | Mani | G06Q 10/00 705/35 |
| 2015/0088706 A1* | 3/2015 | Roark | G06Q 40/12 705/30 |
| 2017/0364996 A1* | 12/2017 | Ventani | G06Q 50/01 |

* cited by examiner

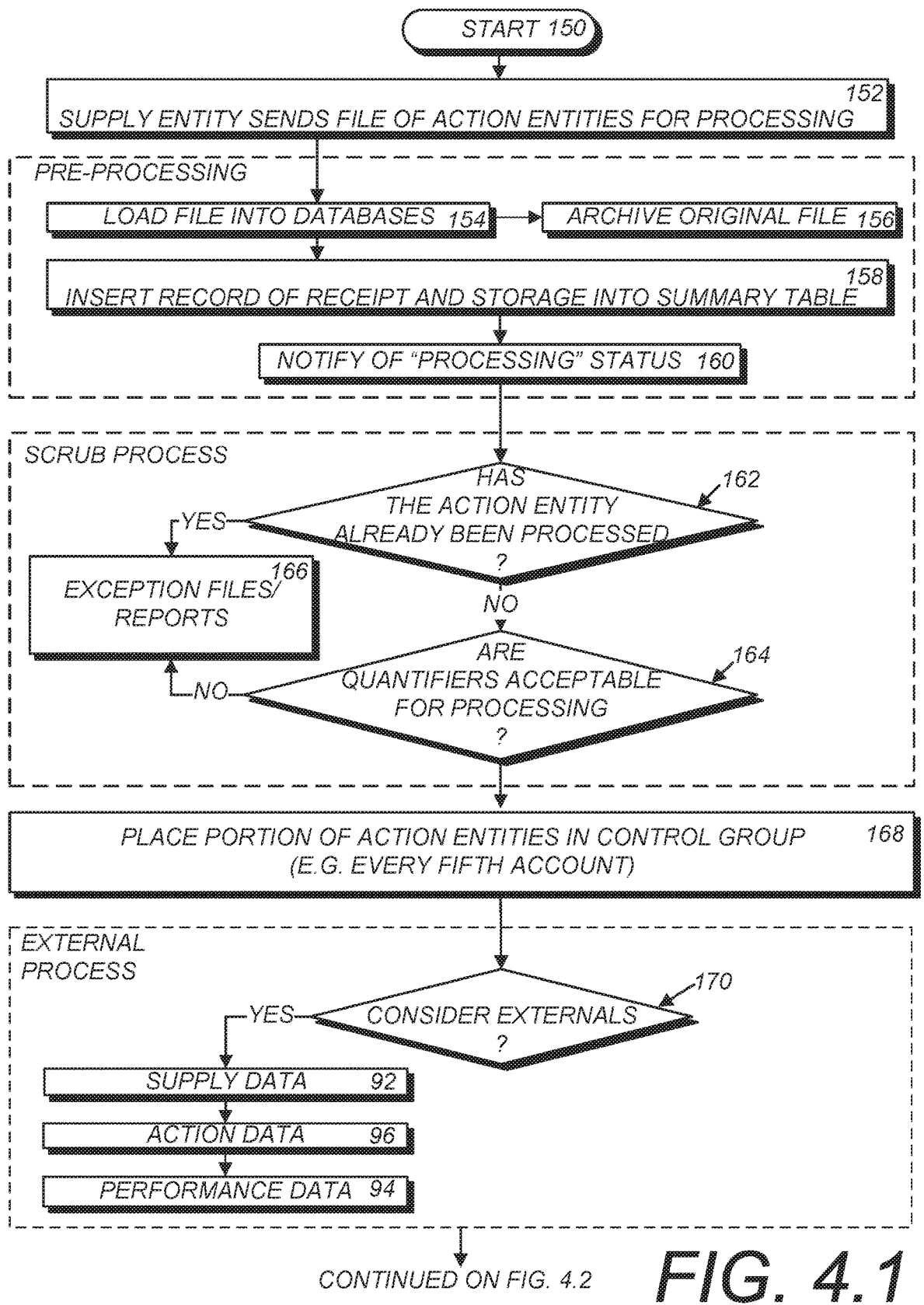
FIG. 4.1

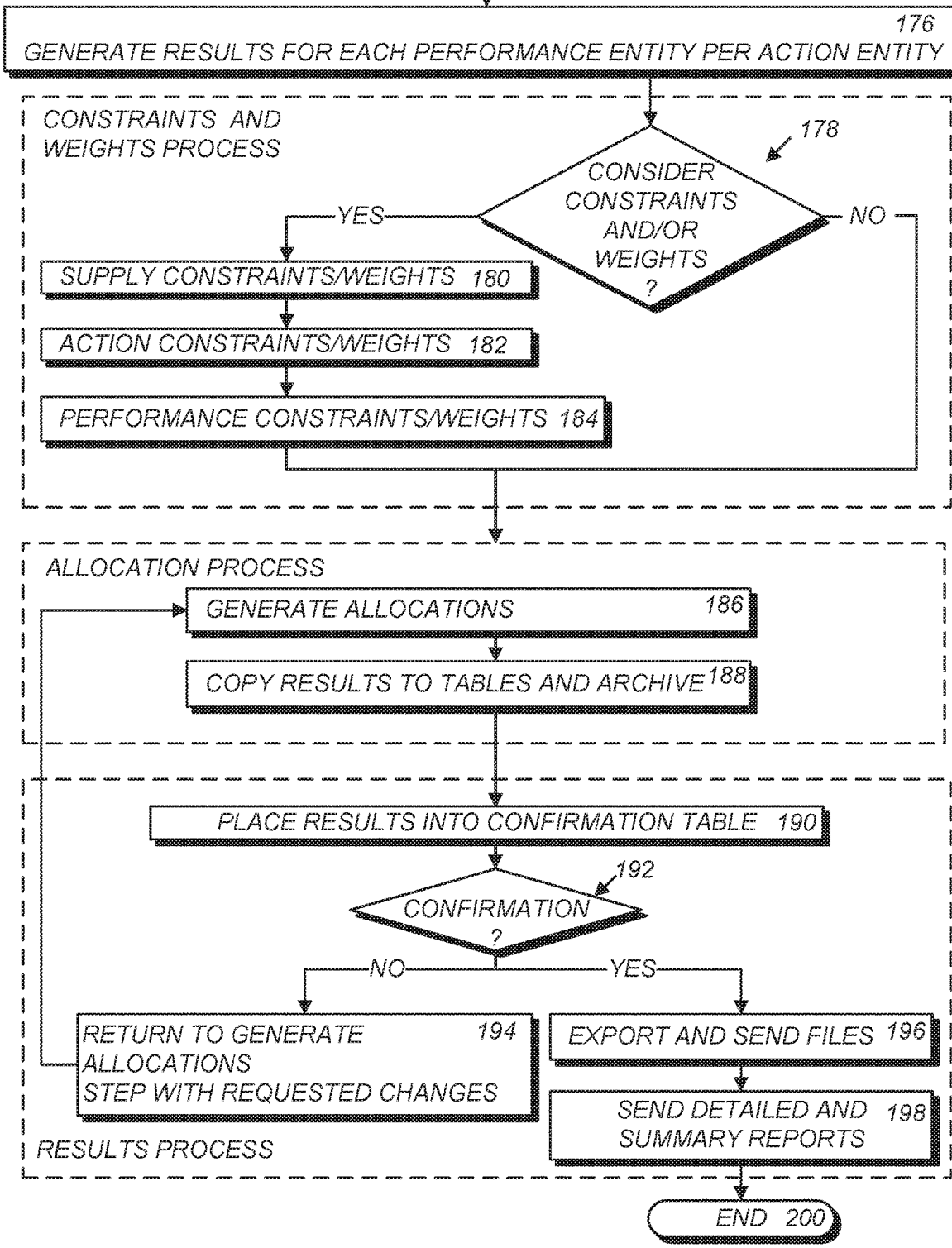
FIG. 4.2

SYSTEM AND METHOD FOR ENHANCING CREDIT AND DEBT COLLECTION

RELATED APPLICATIONS

This application is a continuation, and claims priority benefit, with regard to all common subject matter, of earlier-filed U.S. patent application Ser. No. 14/588,035, filed Dec. 31, 2014, which issued as U.S. Pat. No. 10,325,227, on Jun. 18, 2019, ("the '227 Patent"). The '227 Patent is a continuation-in-part, and claims priority benefit, with regard to all common subject matter, of earlier-filed U.S. patent application Ser. No. 14/145,536, filed Dec. 31, 2013, ("the '536 Application"). The '536 Application is a continuation-in-part, and claims priority benefit, with regard to all common subject matter, of earlier-filed U.S. patent application Ser. No. 12/819,913, filed Jun. 21, 2010, which issued as U.S. Pat. No. 8,620,725, on Dec. 31, 2013, ("the '725 Patent"). The '725 Patent is a nonprovisional, and claims priority benefit, with regard to all common subject matter, of earlier-filed U.S. Provisional Patent Application No. 61/218,743. The identified earlier-filed patents and patent applications are hereby incorporated by reference in its entirety into the present application.

BACKGROUND OF THE INVENTION

1. Field of the Invention

The present invention relates generally to a system and method for enhancing the process by which creditors provide credit and collect debt, and in particular to a system and method for managing debt collection parties and for enhancing the credit score of individual parties seeking credit based on the traits of the individual debt and the debt collection parties involved with a creditor.

2. Description of the Related Art

Various systems and methodologies have previously been developed for managing the debt collection process and the way in which companies provide credit to individuals. Credit scores, such as the Fair Isaac Corporation standard FICO score, Dunn and Bradstreet's DNB score, and the Vantage Score, are the basis for which credit is supplied at present. An individual's ability to acquire credit depends upon the credit score as reported by credit agencies such as Equifax, Experian and Trans Union. This credit score not only applies to an individual's ability to acquire credit, but companies, corporations, and other entities as well.

Credit is central to all major financial transactions in today's economy. Most entities do not possess enough cash on hand for all transactions, and so they rely on credit to make purchases of inventory, personal items, buildings, equipment, and other items that are a normal part of daily life and business. The credit industry is essential to the economic world of today. Many external elements play a role in credit, such as the present economy, stock prices, and the willingness of banks to lend. Likewise, the responsibility of borrowers plays a large role in the ability to receive credit. A borrower's prior conduct, financial standing, and location, along with other traits, play a role in the acquisition of credit from a creditor.

Banks and credit card companies provide lending and credit services to individual entities. When those individuals default on their payments, the lending companies seek the aid of collection parties to collect from these defaulting parties. Collection parties compete with one another to receive these collection accounts from the lending companies. Debt can have many traits, such as the amount, the location of the debtor, and whether it is a primary, secondary, or tertiary debt, depending on whether another company has attempted to collect the debt in the past. Each collection party has its strengths and weaknesses, and the lending parties seek to provide the debts to the collection parties in a way that would best ensure the debt is collected.

When an entity who has been provided credit defaults on their payments, collection parties are hired to seek out and collect on the debt. Often several collection parties will compete for the right to collect on debts owed to the original credit provider. Certain techniques and practices are currently used to best assign owed debts to individual collection parties. One such method is known as the Champion Challenger system. In this system, the "best performers" are assigned the majority of debt collection assignments. The Champion Challenger system does not employ a statistical analysis performed to determine which debt collection party is assigned which piece of debt, and therefore has no way to determine if the assignee will perform optimally when collecting the particular debts assigned. Other existing analysis systems attempt to look at how likely a piece of debt is to be collected depending on the debtor's location, the amount of the debt, and the reason for default. This system fails to take into account the strengths and weaknesses of the collection parties fighting for the particular piece of debt and match the competing debt collection parties to pieces of collectable debt according to those strengths and weaknesses. Still other statistical models exist where collection parties and creditors can score an individual debt on the likelihood of collection; however these models fail to match the traits of the various parties involved in a way that will improve the ability to collect.

The invention presented herein seeks to focus on the traits of all of the parties involved in a credit lending and/or debt collecting transaction. By comparing important traits of the debt itself, all of the debt collection parties seeking to collect on the debt, and the lending party itself, the present invention determines which collection party should be assigned which debt. Alternatively, the present invention can help to modify a borrower's credit score if it can be determined that the individual possesses certain traits that will make a default easier or more difficult to collect. Using known statistical algorithms, plus algorithms developed and implemented specifically for this invention, or unknown algorithms yet to be discovered, the present invention supplies credit and lending companies a more economic method for providing credit ratings and for collecting debt.

Heretofore there has not been available a transaction management system and method with the advantages and features of the present invention.

SUMMARY OF THE INVENTION

In the practice of one aspect of the present invention, a system is provided for managing the way creditors provide credit and collect debt. A system and method is presented wherein businesses can submit their past due accounts receivable and compare collection parties to select the best one for them, based on a variety of characteristics. The preferred embodiment of the present invention will take the chosen traits of a creditor, a number of debt collection parties, and individual pieces of debt, and determine which collection party is best suited for collecting a particular piece of debt.

An alternative use of the present invention allows a creditor providing credit to enhance or decrease a borrower's credit score based upon the collectability of their debt. As an example, a borrower who is determined to be a low likelihood of collection recovery if default occurs could have points reduced from their credit score, whereas a borrower who is determined to be of a high likelihood for collection recovery could have their credit score increased. By comparing the traits of the collection parties available and of the particular borrower in question, the present invention will determine the risk involved with lending credit to a particular borrower, and in turn the ability of the lender, or the lender's collection assignee, to collect that debt using the collection parties available.

BRIEF DESCRIPTION OF THE DRAWINGS

The drawings constitute a part of this specification and include exemplary embodiments of the present invention and illustrate various objects and features thereof.

FIG. 4.1 is a flowchart demonstrating a method of practicing the present invention.

FIG. 4.2 is a continuation of the flowchart of FIG. 4.1 demonstrating a method of practicing the present invention.

DETAILED DESCRIPTION OF THE INVENTION

Figure 1:
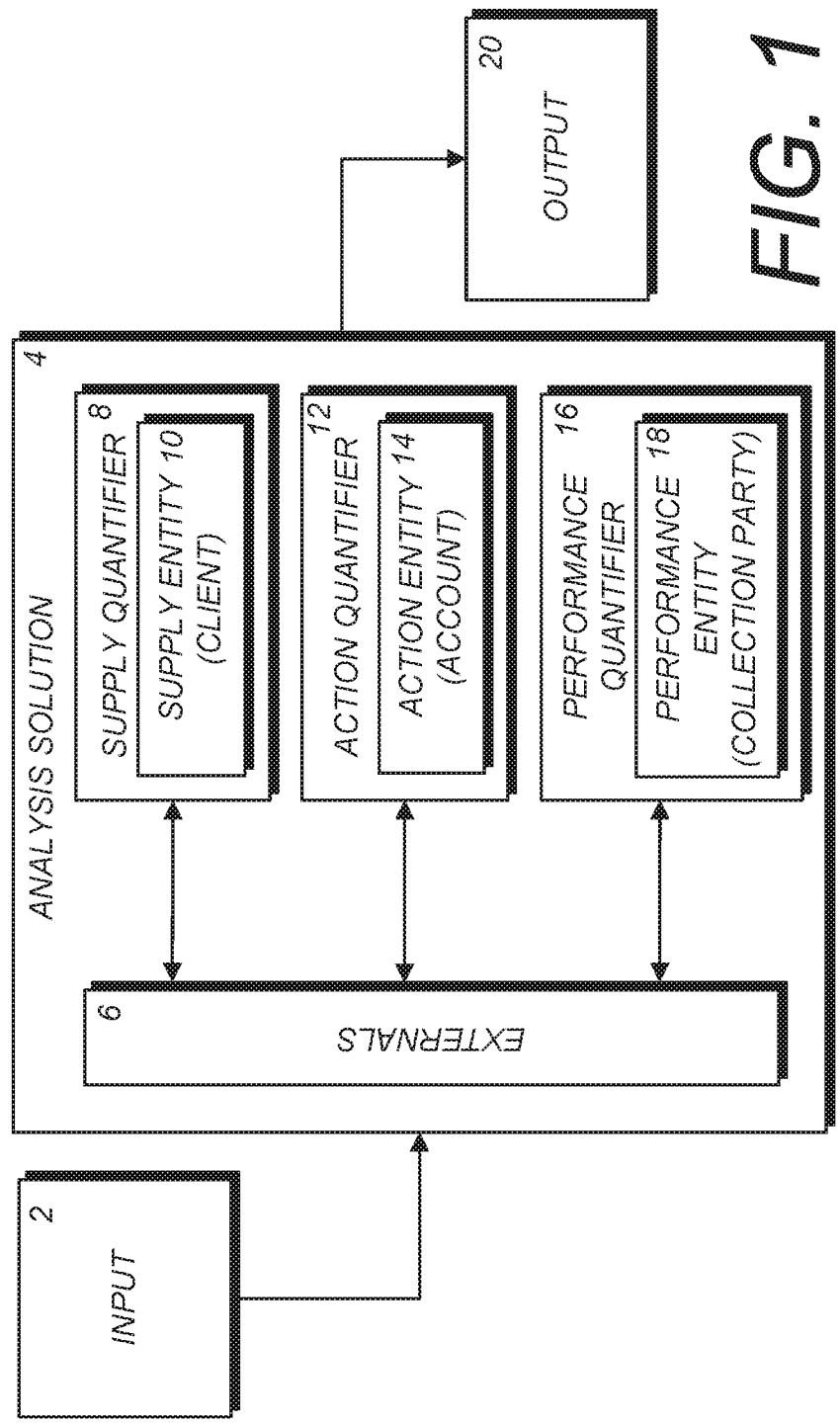
FIG. 1 is a block diagram showing the flow of data into an embodiment of the present invention, with an output resulting.

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, an input 2 enters into an analysis solution 4, resulting in an output 20. In one embodiment of the present invention, the input 2 includes data relating to debts owed to a supply entity (client) 10, the traits of that entity, collected data on a number of performance entities (collection parties) 18, including their individual traits, and data pertaining to a particular action entity (account) 14. In a preferred embodiment, the action entity 14 is a particular piece of debt owed to the supply entity 10.

I. Debt Collection Enhancement System

FIG. 1 demonstrates how the input 2 data flows into the analysis solution 4 and results in an output 20. In the preferred embodiment, the input 2 is a collection of data supplied by a supply entity 10. The supply entity 10 in the preferred embodiment refers to a client, typically a credit lending company, debt buyer, or any party seeking to improve the efficiency of its debt collection practice. Other parties involved include an action entity 14, typically a piece of debt or a debtor account, and a number of performance entities 18, such as debt collection parties, law firms or individual collectors. The client 10 provides particular input 2 into the analysis solution 4. Additional input 2 can be added from additional databases common to the analysis solution 4, from the other parties 14, 18, or from other known databases.

The analysis solution 4 takes the input 2 from the client 10 and combines it with additional inputs 2, including externals 6, supply quantifiers 8, action quantifiers 12, and performance quantifiers 16. The quantifiers 8, 12, 16 include characteristic traits of the three interacting parties involved in the transaction, including the client 10, the account debt 14, and a number of individual collection parties 18. Each quantifier 8, 12, 16 may include a number of traits which will affect how easily the debtor account 14 can be collected on. Externals 6, which include all external influences on the output 20, are optionally considered by the analysis solution 4. Once the input is considered according to the existing quantifiers 8, 12, 16, and the externals 6, the analysis solution 4 produces an output 20. This output 20 is used by the client 10 to allocate each debtor account 14 to individual collection parties 18.

Figure 2:
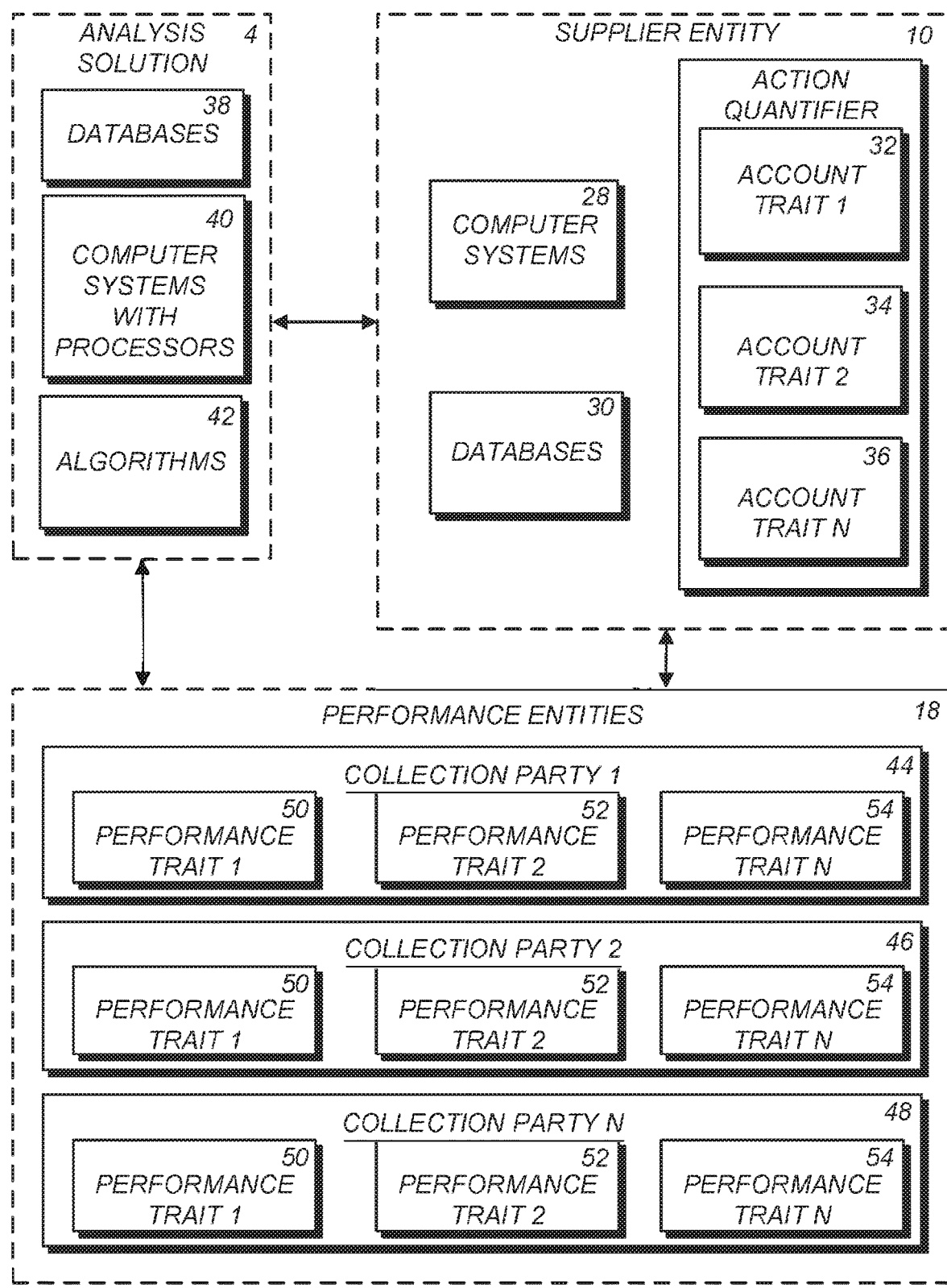
FIG. 2 is a block diagram demonstrating the relationship between three parties forming an embodiment of the present invention.

FIG. 2 demonstrates the interaction between the supply entity 10, the performance entities 18, and the analysis solution 4. In a preferred embodiment, the supply entity (client) 10 includes a variety of computer systems 28 and databases 30 for containing and transmitting data relating to debt collection. The computer systems 28 may include such systems as an accounting system, a server, and various other computer systems for use in the supply entity's 10 practice of its business. The computer systems 28 link to relevant databases 30, including a database containing information on all debtor accounts 14, a database containing information on all performance entities 18 used by the supply entity 10, and other databases. In particular, the supply entity 10 contains a database 30 containing account traits 32, 34, 36 associated with every debt account 14 owed to the supply entity 10. All relevant data known to the supply entity 10 is transferred to the analysis solution 4 so that a complete output 20 will result.

The performance entities 18 refer to a number of collection parties 44, 46, 48. Each collection party 44, 46, 48 is characterized by a number of different performance traits 50, 52, 54. These performance traits 50, 52, 54 are either transmitted to the supply entity 10 and stored in a relevant database 30, or are transmitted directly to the analysis solution 4 from the performance entities 18.

The analysis solution 4 includes a number of databases 38 for containing all received data, including externals 6, account traits 32, 34, 36, performance traits 50, 52, 54, and all other quantifiers 8, 12, 16 relevant to the particular account debts 14 owed to the supply entity 10 and performance entities 18 used by the supply entity 10. The analysis solution further includes a number of computer systems with suitable processors 40 for analyzing received data and running the appropriate algorithms 42 to obtain an output 20. The algorithms 42 employed by the analysis solution 4 may be any suitable algorithm for calculating statistical information using the received data. Appropriate statistical models include Naive Bayes or other forms of Bayesian statistics, regressive models, neural networks, decision tree, clustering, and any other appropriate statistical model for analyzing received data.

The purposes of the algorithms 42 is to break down all received data relevant to the performance entities 18, the action entities 14, the supply entity 10, all externals 6, and any other relevant data, into tiers. As an example, the algorithms 42 will take the past performance of each of the performance entities 18 and break them down into five tiers. All other performance traits 50, 52, 54 will be broken down into the same number of tiers, and each performance entity 18 will be sorted accordingly. Each account trait 32, 34, 36 will then be analyzed and sorted in a similar manner. The analysis solution 4 will then assign the appropriate debtor accounts 14 to the performance entities 18 based on how the sorted account traits 32, 34, 36 compare to the performance traits 50, 52, 54 of the performance entities 18. The traits or input data pieces that are acquired may optionally be weighted, depending on the supply entity's 10 preferences. For instance, the supply entity 10 may wish to place more weight on the past performance of a performance entity 18, rather than on its location.

In addition to individual pieces of data used for increasing efficiency, constraints exist in the system and may be considered in order to satisfy the business strategy of the supply entity 10. These constraints may include the number of debt collection accounts 14 a particular debt collection party 18 may collect on, the special nature of the debt asset in question, or any element that is not a distinct measurable trait, but that affects who may collect upon a debt. These considerations allow the supply entity 10 to assign its debtor accounts 14 in the way most matching the supply entity's desired strategy.

Figure 3:
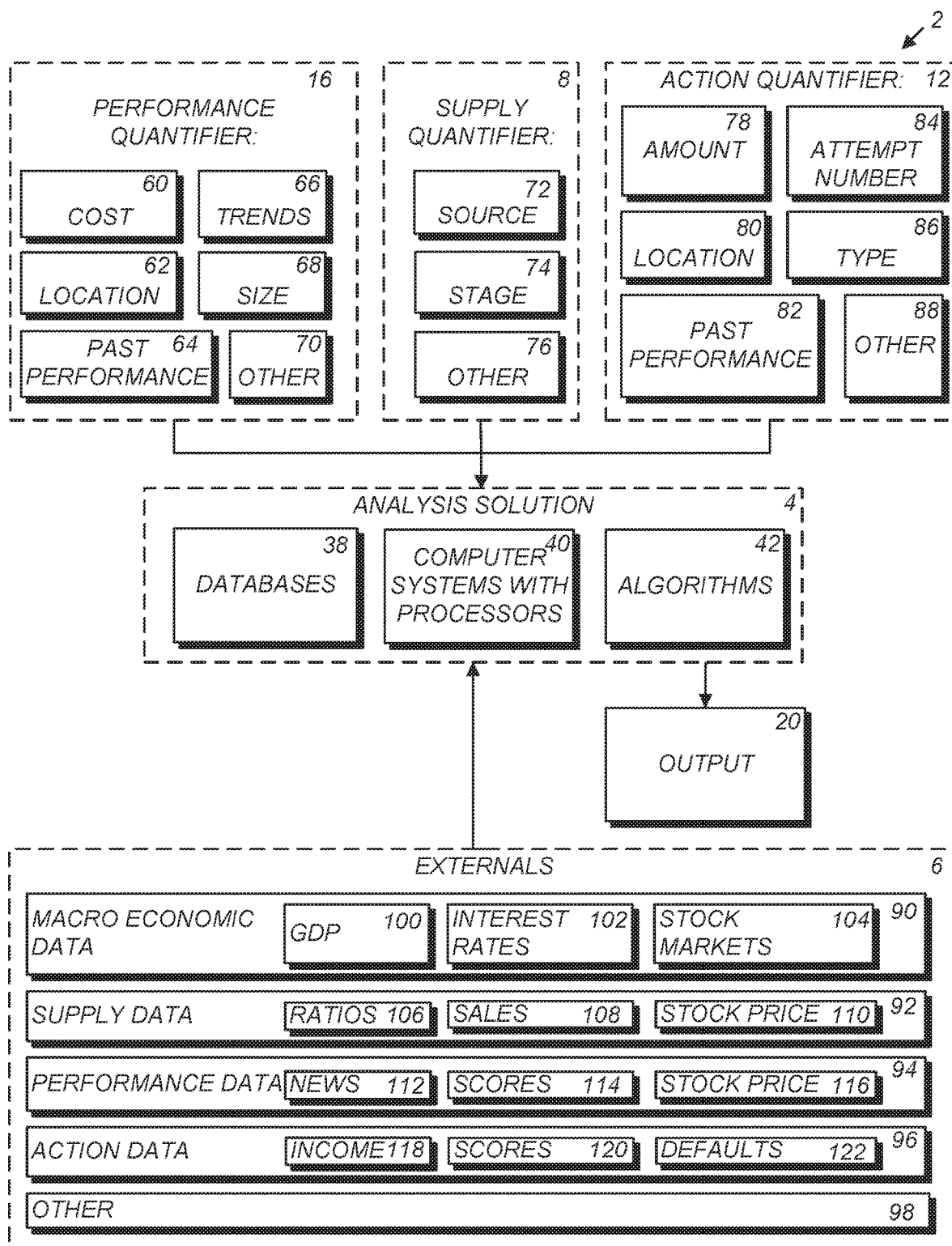
FIG. 3 is a block diagram demonstrating the flow of data during the practice of an embodiment of the present invention.

FIG. 3 demonstrates the flow of the input 2 through the analysis solution 4, resulting in an output 20. As mentioned above, all parties submitting input 2 to the analysis solution 4 include specific quantifiers 8, 12, 16. These quantifiers are typically a number of traits or elements defining each party with respect to one another. The supply entity 10 includes supply quantifiers 8, such as source data 72, stage 74 of the action entity 14, or other data 76 relevant to the analysis solution 4. In the preferred embodiment, where the supply entity 10 is a creditor and the action entity 14 is a debtor account, the source data 72 includes where the account has been sourced from and the historical treatment of the account by the creditor. This may affect constraints on a particular account if, for example, the action entity 14 is a corporate account that is to be handled more carefully than standard pieces of debt. The stage 74 of the action entity 14 refers to work that has been performed on the account by the creditor. This may include previous collection attempts of the debt and the performance entities 18 previously used by the creditor to collect on the debt. Source 72 and stage 74 data refer particularly to elements of the account specific to the creditor and not to the account itself.

The action entity 14 possesses action quantifiers 12. In the preferred embodiment, where the action entity 14 is a debt to be collected, the action quantifiers 12 may include debt amount 78, location 80 of the debtor, past performance 82 of the debtor, collection attempt number 84, type of debt 86, and any other 88 traits relevant to the collection of the debt account. In the preferred embodiment, debt type 86 may include what type of credit was extended to the debtor party, and therefore what type of debt is being handled. This is important if, for example, the action entity 14 is a corporate account that is to be handled more carefully than standard pieces of debt. The attempt number 84 of the action entity 14 refers to whether a particular debt has had previous attempts of collection. A first-attempt collection, or primary stage, will be handled by different performance entities 18 than will a secondary or tertiary collection stage. All of the action quantifiers 12 affect how each performance entity 18 will perform if assigned to collect on the action entity 14, and are vital to efficiently assigning the account to be collected to the collection party best suited to collect that particular account.

The performance entity 18 possesses performance quantifiers 16. In the preferred embodiment, where the performance entity 18 is a collection party, the performance quantifiers 16 may include the cost 60 of services, location 62 of the collection party, past performance 64 of debt collection, trends 66 according to different types of debt collection, the size 68 of the collection party, and other 70 relevant traits relevant to the collection of the debt account. The performance 64 of debt collection may be further broken down depending on the types 86 of debtor accounts previously collected on by the collection party. Trends 66 and past performance 64 may be broken down further into time periods of each, such as past month, past six months, past year, and lifetime of the collection party. Alternatively, other categorizations could also be used such as new, updated, or validated balances, demographic information, or any other relevant or related data points selected or acquired by or on behalf of the supply entity or other relevant party.

These inputs 2 are fed into the analysis solution 4 along with externals 6. Externals 6, as briefly explained above, include outside influences on the analysis solution 4 that are not supplied by the supply entity 10, action entities 14, or performance entities 18. Externals 6 are optional input 2 traits that will affect the output 20. In the preferred embodiment where the supply entity 10 is a creditor, the action entities 14 are debtor accounts, and the performance entities 18 are collection agencies, externals 6 may include macroeconomic data 90, supply data 92, performance data 94, action data 96, and other relevant external sources of data 98.

Macroeconomic external data 90 may include such elements as the country's gross domestic product (GDP) 100, standard interest rates 102, stock market 104 prices and trends. External supply data 92 may include supply entity 10 traits not included in the supply quantifiers 8 for debt collection, such as ratios 106, sales data 108, and supply entity stock price 110. Similarly, external performance data 94 will include performance entity 18 traits not included in the performance quantifiers 16 for debt collection, such as news reports 112 about each performance entity 18, externally presented quality scores 114 for the entity, and the entity's stock price 116. The action entities 14 also include external action data 96, such as entity income 118, externally presented quality scores 120, and other defaults 122 besides the current default the creditor is attempting to collect on. Additionally, action entities 14 may include more specific details and changes such as new or updated addresses, telephone numbers, and related contact information or other information that may be received from external data sources.

As explained above, the inputs 2, including all quantifiers 8, 12, 16, and externals 6, are fed into the analysis solution 4 and processed according to the chosen algorithms 42. In the preferred embodiment, the creditor is seeking to allocate its various debtor accounts to a number of collection parties. By analyzing the input data 2, the analysis solution 4 will determine which collection parties have historically had the most success collecting specific types of debtor accounts. Instead of randomly assigning a number of accounts to each collection party based solely on each party's relative size and capability of actively collecting on debtor accounts, the creditor will be able to assign specific debtor accounts to collection parties who are best suited for collecting those debts.

For example, under different methods for account allocation, a particular collection party may be randomly assigned 50% of a creditor's debtor accounts. These accounts will be allocated to the collection party either randomly or based solely on the types of debts. Using the present invention, however, the same collection party will likely be assigned the same percentage of debtor accounts, but the creditor will instead assign those accounts determined by the analysis solution 4 as having the best chance of being collected by that particular collection party.

The collection party that best satisfies the analysis solution for a particular debtor account may not always be assigned that account for collection. Constraints may come into play where a collection party does not have the resources to collect on additional debtor accounts, so the next highest rated collection party may receive the account. Similarly, some traits may be weighted higher by the creditor than other traits, such as collection party location with respect to debtor account location. This may also result in the account being assigned to a collection party that did not receive the highest correlation to that debtor account.

II. Method of Practicing Debt Collection Enhancement System

FIGS. 4.1 and 4.2 show a flowchart demonstrating the practice of a method of the present invention. A series of steps are presented that will lead input data 2 through the analysis solution 4, resulting in an output 20. Some steps may be optional, but may lead to more refined results.

The method starts at 150. The first step in the practice of a preferred embodiment of the present invention involves pre-processing. Here, data is collected for use by the analysis solution 4. The supply entity sends a file containing the action entities in its possession to the analysis solution at 152. This file may also include gathered action quantifier 12 data that will be used by the analysis solution 4. The action entities file is loaded into the analysis solution database at 154, and an optional backup archive of the original file is made at 156 and stored for later use. Next, the process must insert a record of receipt and storage of the file into a summary table at 158 and notify all involved parties of the "processing" status at 160.

The next phase is a scrub process, where collected data is checked to determine if it is useable for the analysis solution 4. A check is performed for each action entity 14 to determine whether each has been processed at 162. A second check is performed to determine if there are acceptable quantifiers available for processing the input data at 164. If a response of "yes" is returned for a particular action entity on check 162 or a response of "no" is returned for a particular action entity on check 164, an exception file or report is issued at 166.

In a preferred embodiment, a control group is created at 168. After a predetermined number of accounts are passed through from the scrub process phase, an account will be placed into a control group. For example, after four accounts have passed through the scrub process, the fifth account will be placed into a control group. This control group is used to determine whether the analysis solution is performing its job and optimizing the placement of accounts to collection parties. The results of the control group accounts can be compared with the analysis solution 4 output 20. If there is not a significant increase in efficiency shown by the output solution, there may be an error in the process, and so checks can be performed manually.

As stated above, externals 6 can be optionally considered when introducing input data 2 into the analysis solution 4. Externals are considered at 170, and if externals are not considered, the process continues to the next phase. If externals are considered, the external process phase considers external supply data 92, external action data 96, and external performance data 94. Other external data sources may optionally be included.

FIG. 4.2 shows the remainder of the flowchart diagram. Next, the analysis solution 4 will generate results for each performance entity per action entity at 176. Essentially, each performance entity 18 is given a score or report for each action entity 14 as determined by the analysis solution 4 from comparing the various traits and data inputs. Constraints or weights are optionally considered at 178. As briefly explained above, constraints are additional considerations that may affect which performance entity 18 is assigned which action entities 14. For example, there may be an employee size constraint on the performance entity. Even if the performance entity is best suited to handle fifty action entities, it may be limited to only forty because of employee number constraints. Another example occurs when the action entity is a corporate account or is otherwise handled with special procedures. In such cases, certain performance entities may have been trained to deal with these special action entities and will receive priority when being assigned such action entities.

In addition to and/or instead of constraining data, the input data may merely be weighted at 178. As briefly explained above, weighing the data allows the supply entity 10 to customize the dataset according to which performance quantifiers 16, action quantifiers 12, or supply quantifiers 8 it wants to have the most impact. If constraints or weights are considered at 178, the solution will consider supply constraints at 180, action constraints at 182, and performance constraints at 184. Otherwise these constraints will be skipped, and the method proceeds to the allocation process phase.

During the allocation process phase, the analysis solution 4 will generate allocations 186, wherein each action entity 14 will be assigned to a performance entity 18 that has been determined to have the best chances for collecting on the action entity. These results are then copied to tables and archived at 188 for backup purposes. The results are then placed into a confirmation table at 190, and a confirmation check is performed at 192. This confirmation check may be automatically performed by software or it may be manually performed by the supply entity 10. If confirmation is not received at 192, the process returns to the generate allocations step at 194 considering the changes requested during the confirmation check.

If confirmation is granted at 192, the output is exported to a file that is saved and sent to the supply entity at 196. Along with the files, detailed and summary reports are sent to the supply entity at 198. These reports contain the data that was used to allocate the action entities to the performance entities, detailed descriptions on any allocations that occurred because of constraints, and any other important information that the supply entity may want to consider when reviewing the allocation list. The process then ends at 200.

III. Alternative Embodiment Credit Enhancement

The preferred embodiment discussed above describes a system and method for enhancing debt collection practices by optimizing the allocation of debtor accounts to collection parties using an analysis solution. An alternative use of the same or similar information can result in enhancing or decreasing an individual's credit score. This is done by determining how easy or difficult it would be for a collection party known to the analysis solution database and/or supply entity to collect on an individual's debt if they were to default. If the individual is shown to correlate with a number of collection parties, that individual may receive a higher credit score due to a lower risk of collection upon default. The opposite is true if it is shown that the individual would be difficult to collect against if default were to occur.

Figure 5:
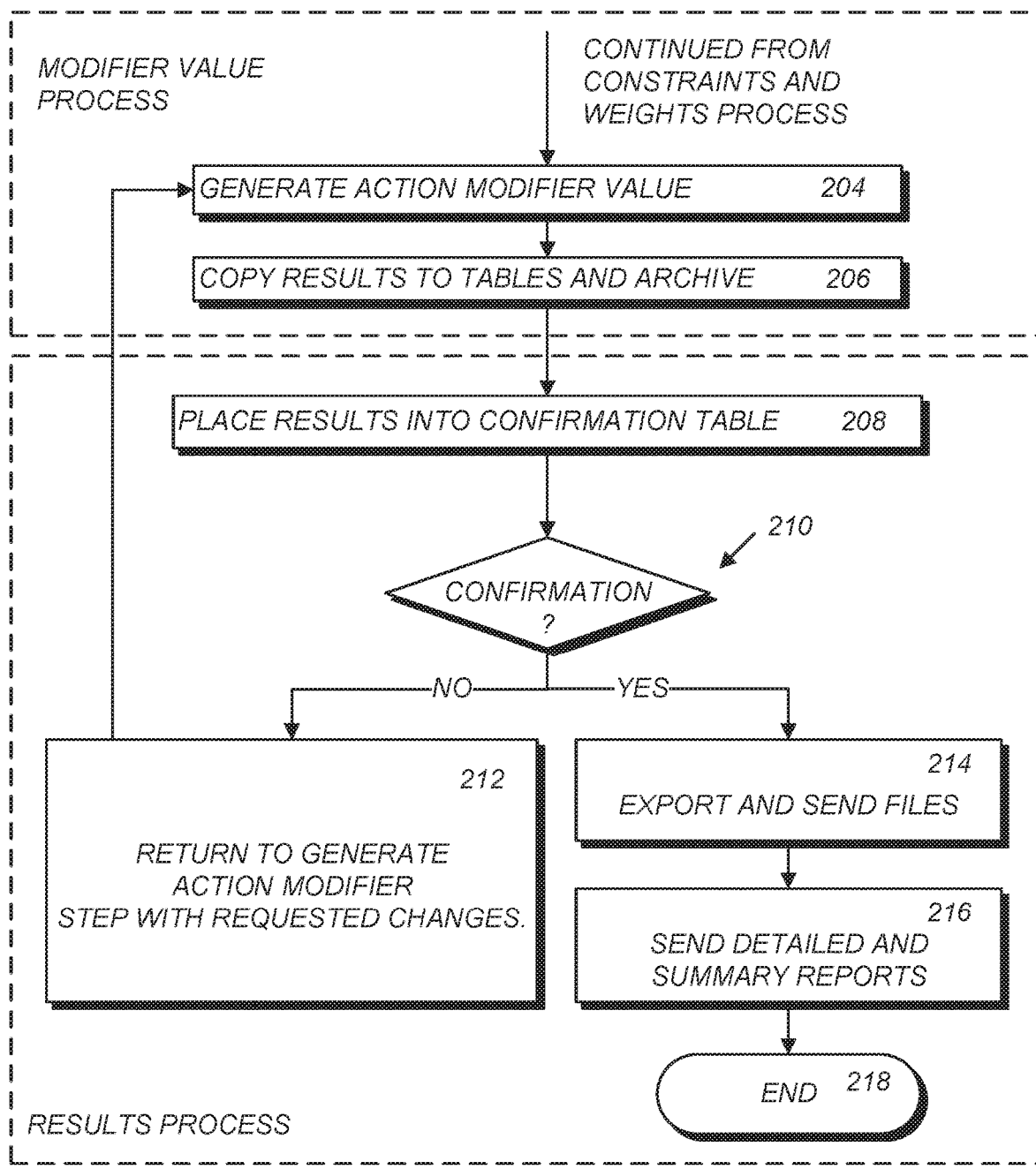
FIG. 5 is a continuation of the flowchart of FIGS. 4.1 and 4.2 demonstrating a method of practicing an alternative embodiment of the present invention.

FIG. 5 expands upon the flowchart shown in FIGS. 4.1 and 4.2, further demonstrating the practice of a method of this alternative embodiment. However, instead of allocating accounts to collection parties, the practice of a method of the alternative embodiment includes generating an action modifier value at 204. These results are copied to tables and archived at 206 and placed into confirmation tables at 208 before a confirmation check at 210. As before, confirmation can be performed by the software automatically or manually by the supply entity. If confirmation is not granted at 210, the process returns to generate the action modifiers again based on the requested changes made at 212.

Upon final confirmation, the files are exported, saved, and sent to the supply entity at 214, followed by the sending of detailed and summary reports at 216. This data helps a supply entity, typically a creditor, determine what credit score to assign to an individual seeking credit. The process ends at 218.

While the present invention would typically be used for the embodiments as described above, the previous examples are not intended to limit the present invention in any way. It should be noted that the present invention could be used as a system or method for establishing a new credit score. Based on the quantifiers, externals, and other data sources acquired by the present invention, a new credit score can be provided that would be based on more information than existing credit scores.

IV. Detailed Breakdown of Debt Collection Enhancement System 302

Figure 6:
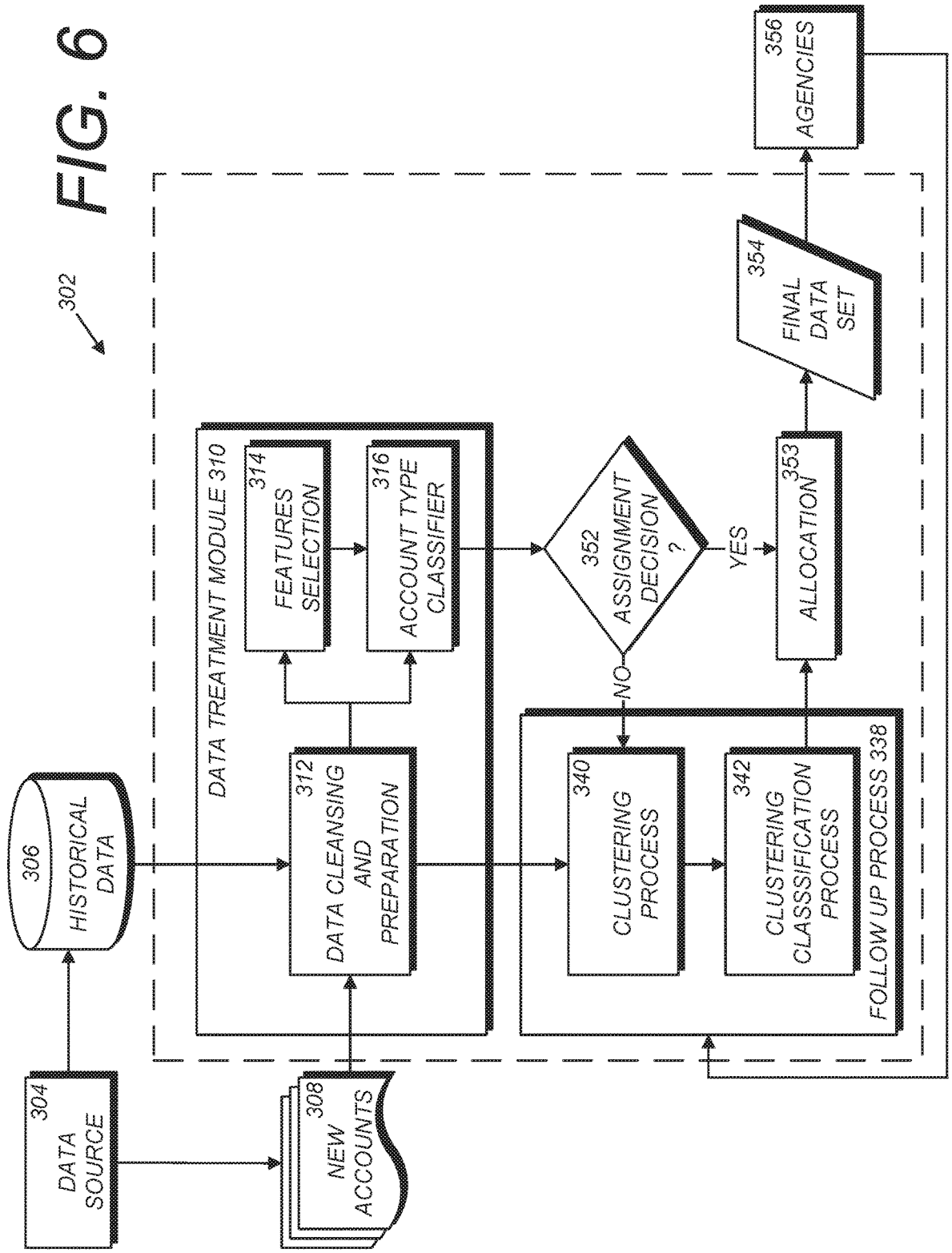
FIG. 6 is a flowchart demonstrating a method of practicing another alternative embodiment of the present invention.

FIGS. 6-10 break down the debt collection enhancement system 302 into more detailed parts resulting in dynamic placement of debtor accounts to collecting parties (e.g., account type classifier) and/or generation of a payment method indicator or payment score. FIG. 6 shows how a data source 304 creates an input for the system as described for the basic system above. The data source 304 can provide historical data 306 for an existing account, or new accounts 308, including relevant known data, which would be entered into the system 302.

All incoming data is placed into a data treatment module 310. In this module, data is treated automatically by the computer overseeing the entire system. The best set of descriptors which apply to each element of the dataset are selected, and a classifier or multiple classifiers are applied to the data, including at least an account type classifier 316. These classifiers are the key to differentiating each account into separate payment types, such as: (1) Paid in Full (PIF), wherein the debtor agrees to pay, in a single installment, the full balance of the account; (2) Settled in Full (SIF), wherein the debtor agrees to pay the full balance in the account in a predefined number of installments; (3) Payment Plan (PPA), wherein a payment plan has been established for the debtor account; and (4) Partial Payment (PP), wherein the debtor simply makes a partial payment and agrees to make another payment toward the new balance, after a certain number of days, but no agreement is made upon specific values. Other payment schedules, types, or categorizations of the accounts would be equally suitable here, if selected by the supply entity or other relevant party. Other examples include balloon payments, short term payments, payment amounts (e.g., tiered), payment intervals, a debtor's ability to pay, etc. If an account cannot be classified in any of these four classifications, it will be placed into a "conventional accounts bucket" and be treated to a second level of treatment. The payment method indicator becomes an account trait 32, 34, 36, as shown in FIG. 2. Other factors could also become account traits, depending on what data values or data elements are supplied from external sources. Almost anything could qualify if it is relevant to generating feedback to the analysis solution 4.

A step of automatic data cleansing and preparation 312 requires verifying the integrity of the data from the data source 304 and removing or otherwise resolving inconsistencies, missing values, outliers, and other anomalies. This step is key because the classifiers are sensitive to "noise." It is important to create and use "clean" data, stored in a specific format to increase the accuracy of results using the data.

Once data has been sufficiently "cleaned" through the data cleansing and preparation step 312, a second step may take place. This step of data preparation determines when certain descriptors or variables need to be transformed such that all of the descriptors are represented in the same way. For example, if one variable is used to represent the individual's linear age in years, and the individual's location through an area code, the result would be: one numeric variable (Age in Years) and one categorical variable (Area Code). Although area code is represented numerically, those numbers don't have an algebraic meaning Transformation can take place by assigning an area code with a "location code" that corresponds with a geographic location that can be handled algebraically, or conversely the individual's age in years can be assigned a categorical value depending on a predetermined age range. These are merely examples of how this data cleaning and preparation step may take place.

Once data is cleansed and prepared at 312, it may either directly be placed into account type classifiers at step 316, or the data may further go through a process of features selection at 314. The features selection step 314 is the process of evaluating the existing variables in a data set and selecting the ones that can best describe each one of existing classes one is trying to identify. During the features selection process step 314, the system 302 analyzes each individual variable and assesses its discrimination power through statistical analysis (such as correlation analysis), and then generates new variables through linear combinations of the existing descriptors in an attempt to increase the discrimination power. The features selection step 314 is also an efficient way of reducing the dimensionality of the data, by keeping only the most valuable descriptors and, at the same time, increasing the system's efficiency. There are different ways of performing features selection as described in more detail below.

A classifier for the processed data may be generated at the account type classifier step 316, which may take place after the features selection step 314 or simply after the data cleansing and preparation step 312. Generating a classifier able to accurately categorize incoming accounts into one of the four existing payment types is the ultimate goal of the features selection step 314. This may also lead to repeatedly classifying these new accounts through the account type classifier step 316 so they can be more precisely sent to the agency that brings higher chances of collecting the most from that specific account. The account type classifier is a general instance of supervised learning and can be designed and implemented using different types of statistical classification algorithms such as neural networks, decision tress, Bayesian classifiers, etc. The choice of what algorithm should be used depends mostly on the quality of the available data.

Figure 7:
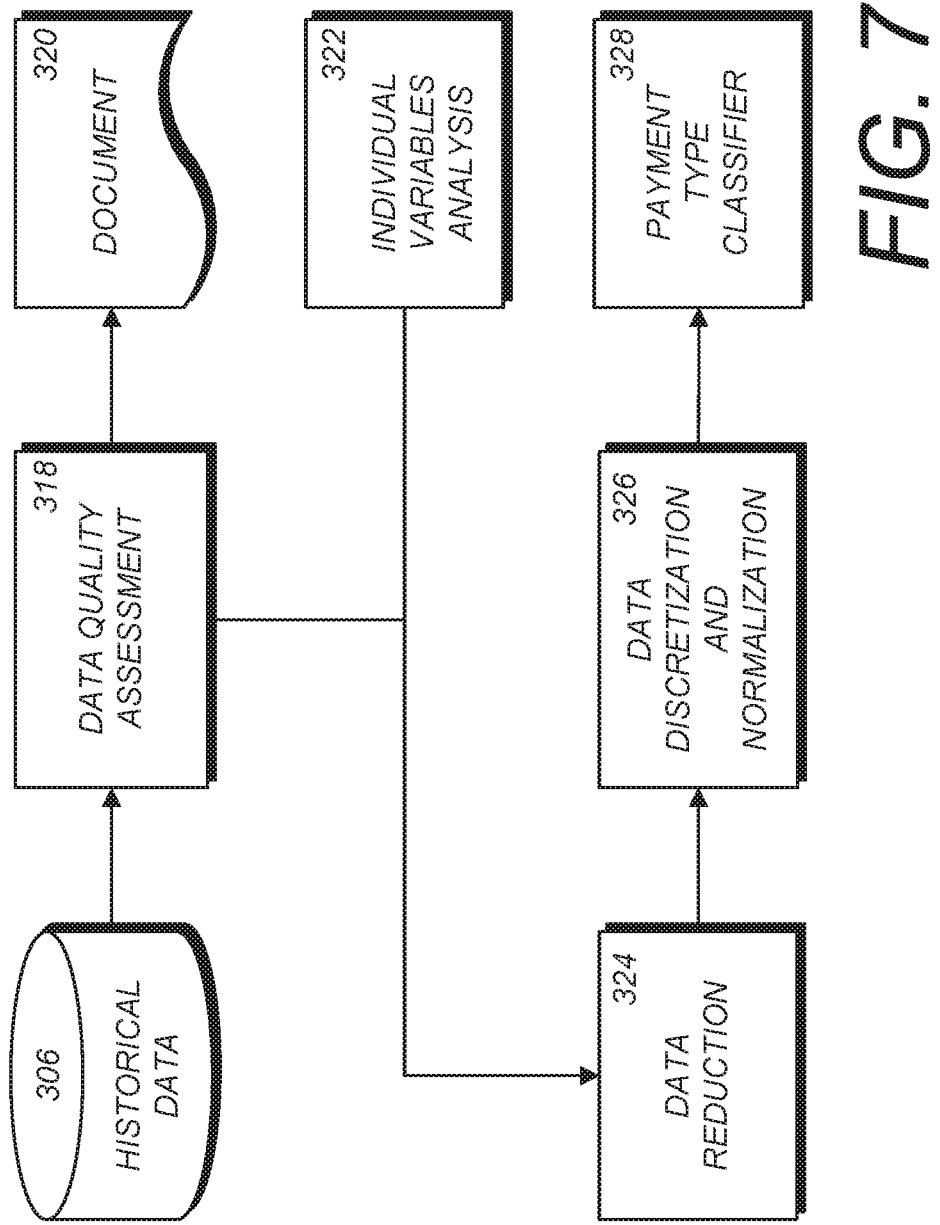
FIG. 7 is a flowchart diagramming a portion of the flowchart from FIG. 6.

Backing up slightly, FIG. 7 breaks down the historical data 306 that may be introduced into the system 302 via the data source 304. The historical data is fed through a data quality assessment step 318. The data quality assessment will generate a list of usable variables which will be analyzed by individual variables analysis performed at 322, after which the data is fed directly into a data reduction step 324. Alternatively, the historical data may be fed directly into the data reduction step 324. This combination verifies inconsistencies and missing values as well as the existence of outliers. Based on the result of this analysis, some records may be excluded from the training process and/or some variables will be discarded due to their low discrimination power. All data fed through the quality assessment step 318 is documented at 320 and saved for other purposes or for quality and/or fact checking purposes at a later time.

Next, a data discretization and normalization step 326 occurs. This is where variables are placed all on the same "standard" format, such that it can be compared in an "apples to apples" comparison. As discussed previously, this will simplify the analysis process by transforming all algebraic identifiers into categorical identifiers or vice versa. This results in the account type classifier 316 as discussed above. The final product of this part of the process is a classifier able to analyze an account based on its attributes and determine the chances of that account being one of the four existing account types. In a situation where the probabilities for all classes are very low, the account is sent to a "follow-up" process 338 discussed in detail below. The ultimate result is to generate a payment type classifier 328 to apply to each account.

Figure 8:
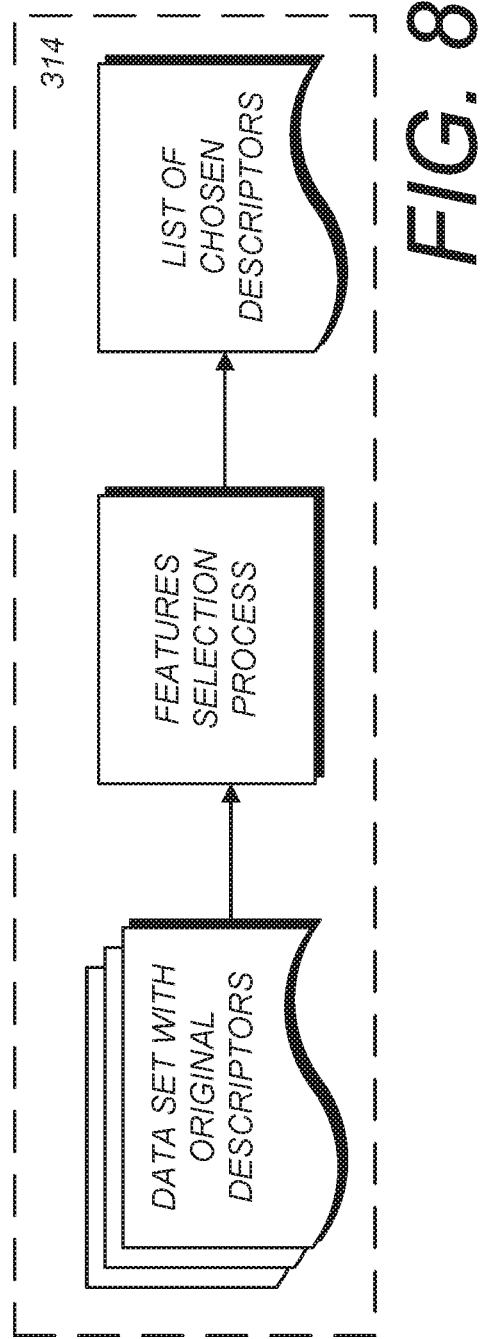
FIG. 8 is a flowchart diagramming a portion thereof.

Before proceeding through the main flow chart as shown on FIG. 6, the feature selection 314 step is broken down into more detail in FIG. 8. As indicated above, the features selection step 314 is the process by which the computer system chooses a set of variables or descriptors that best "describe" or otherwise relate to each one of the existing classes in a generated data set (e.g., forward sequential selection or backward sequential selection). For the purposes of further explanation, FIG. 8 diagrams out how the original data set of original descriptors 330 is modified by the features selection process at 332 and documented at 334 to result in the features selection step 314 which is applied to the incoming data elements.

Figure 9:
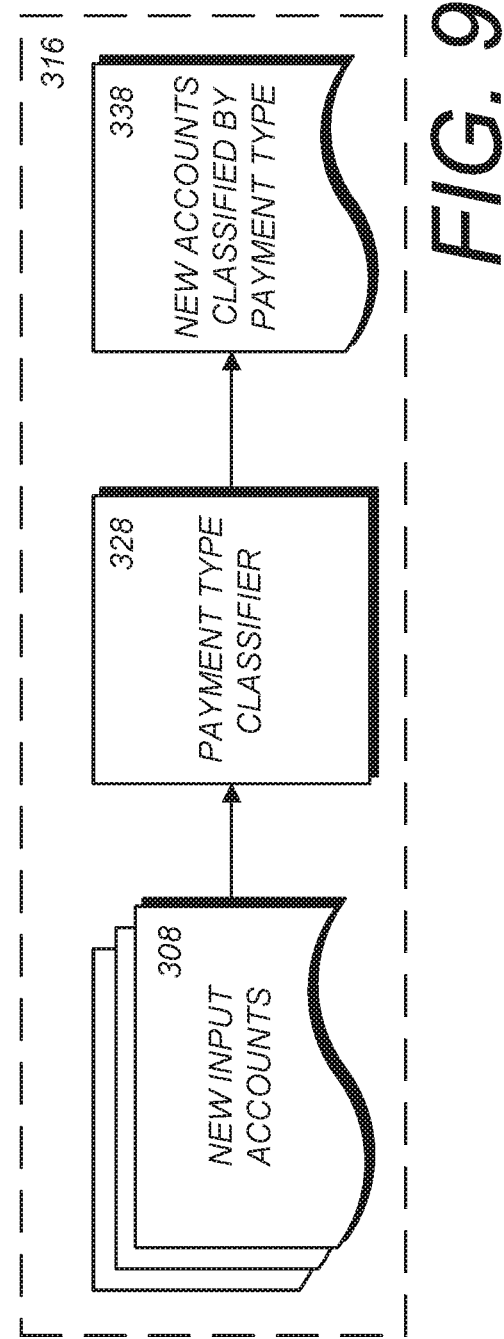
FIG. 9 is a flowchart diagramming a portion thereof.

FIG. 9 expands upon the account type classifier step 316. New accounts 308 are identified with a payment type classifier 328 as discussed previously, and then are transformed into classified new accounts 336. This is the preferred way of classifying accounts and/or other data input into the system 302. However, as discussed previously, some accounts may not be easily placed into the account classification presented here, and must go into a "follow-up" module 338. Data or accounts that were unable to be classified to a payment type are placed into a "follow-up" module 338 according to statistical properties that significantly improve the placement process, and are then fed into a clustering process 340 as shown in FIG. 6 and in more detail in FIG. 10.

Figure 10:
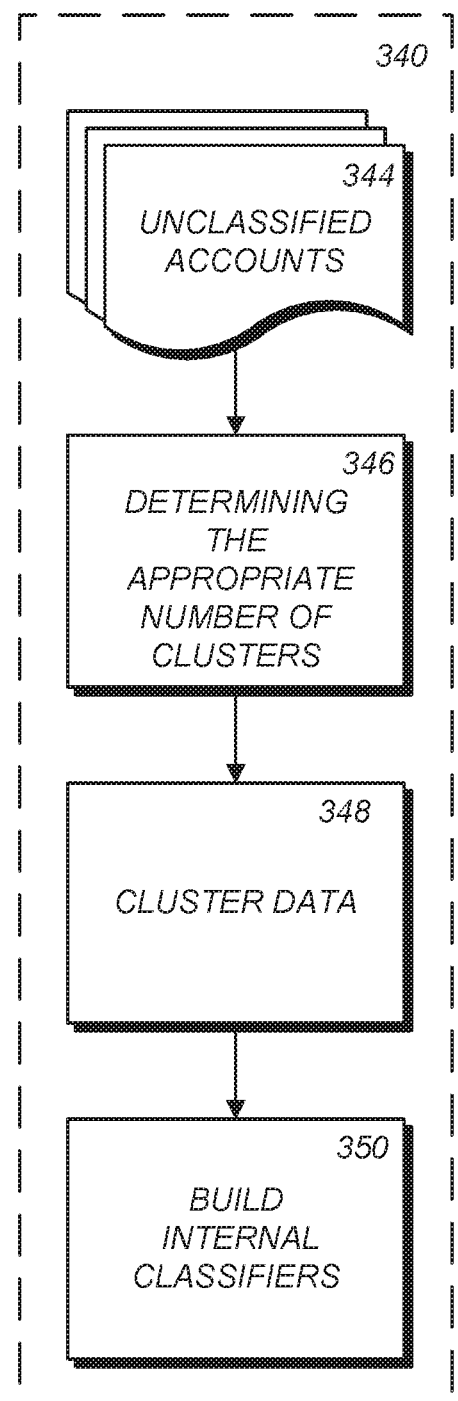
FIG. 10 is a flowchart diagramming a portion thereof.

The "follow-up" module 338 is shown in FIG. 6, generally including the clustering process step 340 and the clustering classification process step 342. FIG. 10 goes into further detail regarding this clustering process step 340. Unclassified accounts 344 must be separated into "clusters" or identifier groups which help to categorize/classify the previously unclassifiable accounts that do not fit into one of the payment types. The system 302 first determines and generates an appropriate number of clusters at step 346. The number of clusters should be minimized as much as possible. Data is then clustered at 348 into one of these clusters/categories based upon a selected piece of data (or multiple data samples) as determined by the computer system. Internal classifiers are built at 350 to bring the clustered data sets with the previously classified accounts. When classifying accounts based on payment types it is possible to assess the eligibility of an account to be classified as being this or that payment type. This is done through a scoring system based on a number of elements, notably the historical performance of a given agency, its current ability to perform (collect) as well as specific characteristics of the account itself. This process will use all this information to not only try to classify the account in one of the possible payment types but also a payment score, which informs a degree of certainty with which that decision was made.

The clustering process 340 is composed of two main steps: first, the system will try to mimic the same type of processing used to implement the basic payment type classification, by clustering the accounts in a certain number of clusters that are concise and far apart from each other. The desirable number of clusters is unknown beforehand and is dependent on the data set. Once the clusters are formed, the second step of the process builds a classifier for each agency inside each cluster. The result may end up with n clusters. The client may have m agencies. Therefore, the result will end up with n.times.m classifiers. Although the number of accounts surpasses the number of agencies by a large amount, it makes sense to send different accounts to the same agency for one of the reasons previously determined via the algorithm.

Clustering, or unsupervised learning, is the process of grouping together elements that present similarities among them according to the variables they are represented by. As an example, customers, and consequently their buying habits, can be seen through different perspectives such as the types of products they buy, the time of year they spend more money on certain types of products, states where customers spend more on a specific type of product, etc. In the present case, the system 302 uses the data categories (e.g., fields) customers select when applying for credit. These categories may include age, address, or the name of the store they are buying from, and these variables can be used to group those accounts in a certain number of clusters. Determining the right number of clusters is the first step and one that can be accomplished throughout a different number of techniques as briefly discussed above. One of them is to use hierarchical clustering and a dendrogram that can show the distance between different groups of data points. Once this task is done, the next step is to use this number of clusters as a parameter to some more robust clustering algorithm, such as the fuzzy based methods, density based methods, etc. Data used for clustering purposes, including the categories above, is fed directly from the data cleansing and preparation step 312 via line 313. Note that this line indicates the flow of data for use in the clustering process only, and does not reference a flow step. All data must pass through the data cleansing and preparation step 312 to either the features selection step 314 or the account type classifier step 316.

The clustering classification process step 342 is where individual classifiers for each agency are generated inside of each individual cluster. These classifiers will be looking at the historical performance of each one of the running agencies in order to establish a link between that performance and the instances of each one of the variables representing the data points (e.g., accounts). For example, the system can verify that cluster k has most of its accounts with balances between $200 and $500 from apparel stores. The system will then search amongst the existing known agencies, and determine how well each of them has historically performed in collecting from that specific segment. These numbers are all calculated behind the scenes by the operating classifiers and clustering algorithms. Examples of possible classifiers that can be used during this phase of the process include neural networks, linear, non-linear and logistic regression, among others. It should be noted that data clustering is not the only method of analyzing and sorting data. For example, simple weighting scores could be used to arrive to assignment conclusions, as could neural networking or other data handling methods.

Once the data has been classified and/or clustered, the system will determine whether a preferred performance entity exists to handle the data as organized. This occurs at an assignment decision step 352, which is optional as all data could flow in one direction or another. It is possible that the database contains no agencies which would be recommended to collect upon the accounts set that has been generated. In such a case, no agency would be assigned the account and the account data would go back into the follow-up module for re-clustering. If an agency is selected, the classified or clustered data set is placed into the allocation queue 353 and assigned as a "final data set" at 354 and is sent to the performance entity or performance entities at 356 for collecting. It should be noted here that data on all agencies is collected and kept in real-time and is fed back into the database and into the follow-up process. An agency's rank or classification for collecting a particular kind of debt can rise or fall over time. If clustering is not necessary at the assignment decision step 352, the data set simply is placed into the allocation queue 353 and sent out into the final data set 354.

The allocation queue 353 is fed allocation thresholds 303 which are based upon the data source 304, including all relevant attributes of that data source. These allocation thresholds 303 perform the function of "thresholding" as described in more detail below and in FIGS. 11-12. This is a completely separate function and step performed by the system after scoring takes place. Thresholding essentially balances the allocation of resources amongst collection agencies, individual agents, or other participants within the process.

FIG. 6 could alternatively be shown with an alternative flow of data through the debt collection enhancement system 302. In such an alternative arrangement, the line 313 from FIG. 6 is removed. The decision box for assignment decision 352 is also removed. Although this arrangement could have occurred naturally through the flowchart diagramed in FIG. 6, which would clarify that all data will filter through the clustering process 340 and clustering classification process 342 of the follow up process 338 prior to allocation 353. However, this alternative arrangement is equally possible with the arrangement as shown in FIG. 6; the alternative arrangement would merely clarify this point.

V. Risk Assessment and Compliance Management System 402

Historically, risk management has relied on self-governance and manual assessment of compliance standards adherence by the operating entities. Poorly managed self-governance can result in a high degree of exposure and risk of compliance violation which can result in penalties, censure and revocation of operations. The toolsets available for monitoring compliance are not robust and neither proactively initiate remedy nor take action to reduce or eliminate the exposure to risk associated with non-intervention, the consequence of which can be severe both in terms of potential penalties and loss of business as well as fines and operational censure.

The present invention can also be used to provide a means to manage the risk associated with compliance in debt collections. By combining tracking with measurement, a risk score is generated which is then used to initiate automated actions and notifications that proactively protects the debt owner (e.g., supply entity 10), and/or manager (e.g., performance entity 18), from compliance violations. The risk score can either result in complete termination of a performance entity from the database or the creation and application of a compliance exception which limits a performance entity to accounts of which the performance entity has the required compliance status to collect upon. These mechanisms are activated as an integral part of the workflow process, submitted via input 2, and can be introduced either as a software solution that integrates with the operational environment or via a hardware solution that incorporates the essential rules and algorithms and is available as an accessible device within the operating network of the utilizing entity, either supply entity 10 or performance entity 18.

While this method is similar to, and utilizes many of, the same measurements and information that are manually administered by others, the unique nature of this solution is that it produces an assessment score representing the health of a particular entity that is acting on accounts. This score is then used to automatically drive specific decisions and actions that affect the ability of the entity to access and process accounts, thus aiding in maintaining a high degree of compliant operations. This may be used as a pre-process validation for performance entities 18 to be allowed to receive accounts or to continue to work prior placed accounts.

Figure 11:
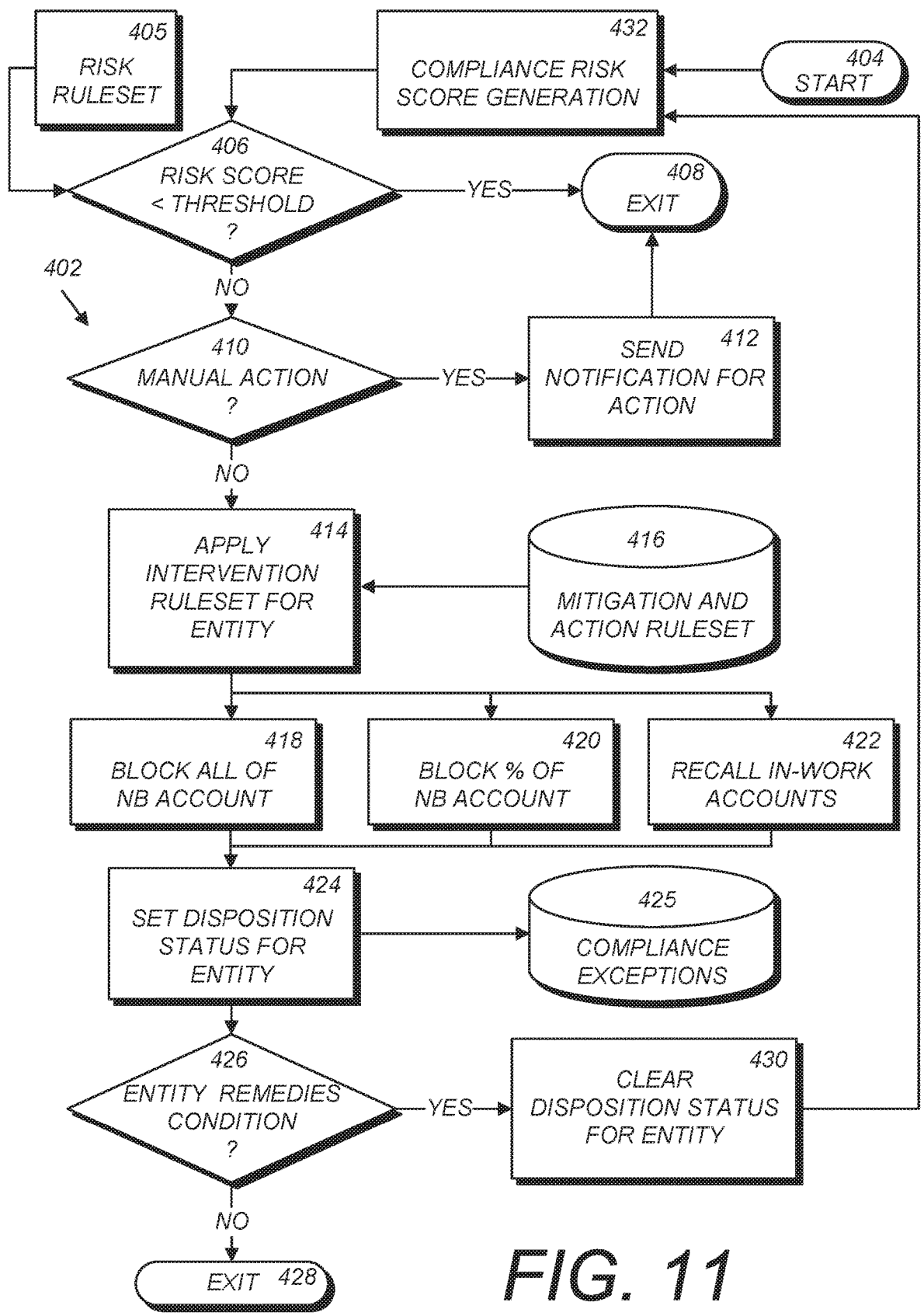
FIG. 11 is a flowchart demonstrating a method of practicing yet another alternative embodiment of the present invention.
Figure 12:
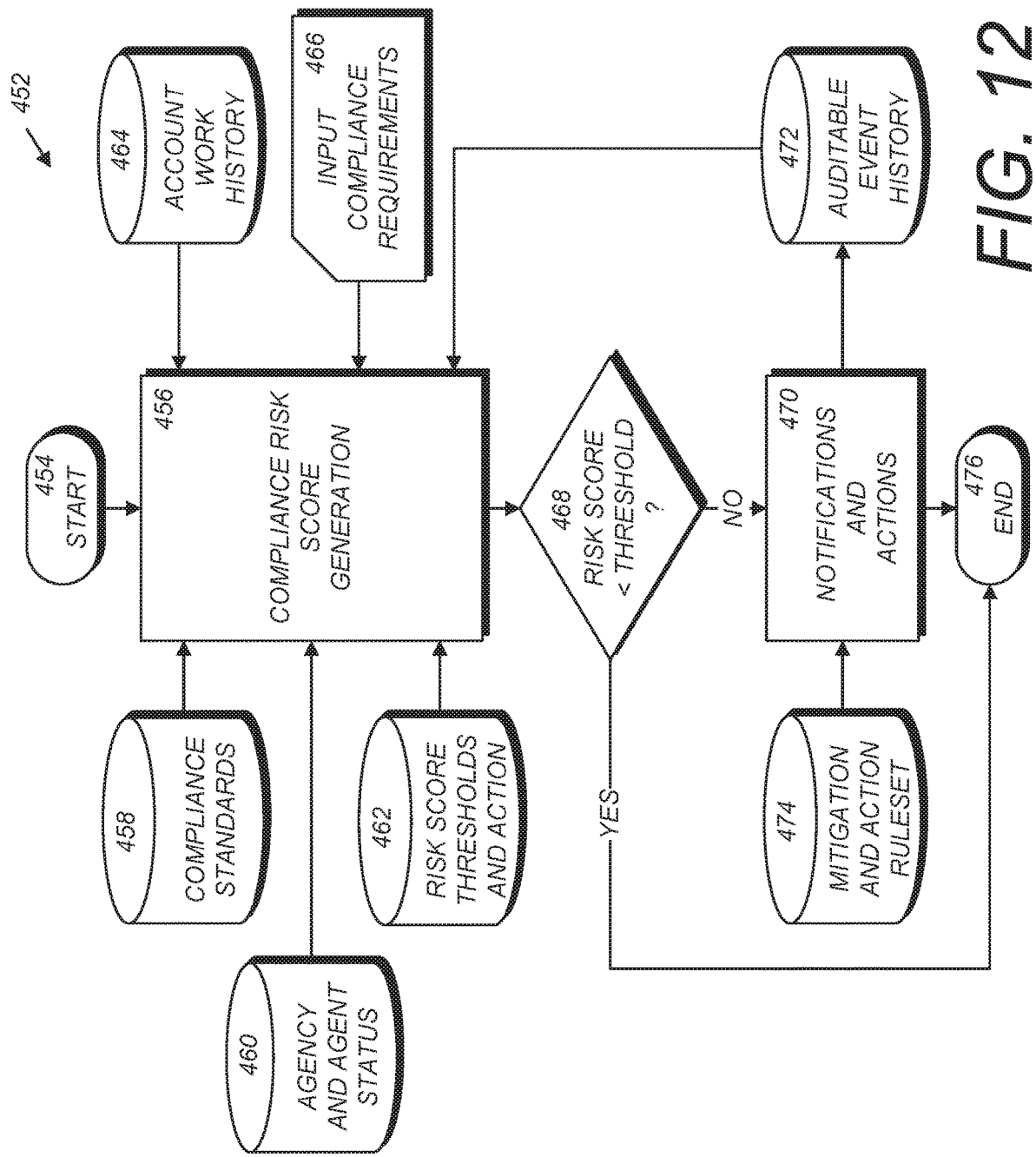
FIG. 12 is a flowchart demonstrating additional steps to practicing the method thereof.

FIGS. 11 and 12 diagram a method of applying the present invention to a risk assessment and compliance management system 402. This system would typically be employed by financial institutions when assigning debt collection duties to third party collection agencies, but could be used in a number of other situations as well to automate the assigning of duties to entities based upon legal compliance and a risk assessment standpoint.

The basic premise here is to generate a computer system for risk assessment which runs through a series of steps to, ultimately, generate a compliance "risk score." This step-by-step computer-implemented method is diagramed in some form at FIG. 11. The process starts at 404, the score is generated at 432 and the computer weighs the risk score against a particular threshold at 406. A risk ruleset 405 is pre-loaded to determine the risk score threshold(s) of the relevant data inputs. If the risk score is less than the predetermined threshold, there is no issue and the process exits at 408. Otherwise the process continues on and the system will determine at 410 whether manual action is necessary to bring the risk score to compliance levels.

If the system determines that manual interaction by an operator or other agent is necessary to adjust the risk or correct an error (e.g., issue with compliance or licensure), then the necessary agent is sent a notification for action at 412, after which the automated system exits at 408. When the system starts again, it will check to determine whether or not the corrective measures have been taken.

If no manual action is determined to be needed at 410, then the process will automatically apply a pre-determined or pre-set intervention ruleset for the entity at 414. The necessary steps, commands, instructions, or features must be loaded initially and/or updated at later times via a mitigation and action ruleset 416. This ruleset is downloaded into the computer system and updated as necessary to ensure the system has the necessary access, commands, passwords, and other information to perform autonomous steps toward compliance and reduction of risk score.

When applying the intervention ruleset at 414, multiple options are ultimately available. Ultimately, a performance entity will either be determined as compliant or non-compliant, and upon being deemed non-compliant may be eliminated completely or be placed under a compliance exception. As examples, the system may block all of the new business (NB) accounts at 418; the system may block a portion of the NB accounts at 420; or the system may recall existing in-work accounts at 422. An example of step 420 would occur when the performance entity fails compliance in a particular region (e.g., a state), and the compliance management system removes all accounts associated with that performance entity from that particular region, but all other accounts from other regions remain with the performance entity. In such a situation, a compliance exception is applied to the performance entity wherein they are kept in the database, but flagged and prevented from being assigned accounts from a region in which they are not in compliance.

The entity is then assigned a disposition status at 424—likely "non-compliant" or otherwise unable to serve the client at this time until the appropriate measures are taken—and any non-compliance is recorded as compliance exceptions 425 to be used in the subsequent generation of any risk score 452. A check is performed at 426 to determine whether or not the entity has remedied the initial condition resulting in a need for interaction. If the entity has been unable to resolve the issue or otherwise remove the conflict, the system exits at 428 and other steps may be necessary. However, if the entity in question has remedied the condition or if the functions of the system have otherwise resulted in the entity being able to bring the entity's compliance back in check, the entity's disposition is cleared at 430 and a new compliance score for that entity is generated at 432. Do note that the entity may be unable to be selected by the analysis solution 4 or receive compliance exceptions 425 for certain subsets of work while that entity's risk score is greater than the predetermined or updated threshold requirement at 406 or if they have certain disposition status 424.

FIG. 12 goes into greater detail about how the risk score is actually generated using a risk score generation subsystem 452. This subsystem is implemented through a computer-implemented method of steps starting at 454. The compliance risk score must be generated at 456 before it can be weighted against a known or unknown threshold. The compliance risk score is generated by checking on various datapoint inputs and determining the licensure compliance level, work history, and other relevant factors of the entity which is being assigned the score.

For example, the compliance risk score generation 456 step takes into account various compliance standards 458 (e.g., regulations), agency and agent statuses 460; various other risk score thresholds and actions 462 which may have occurred previously or are pending; account work history 464, including history which may pertain to a specific set of account data; and compliance requirements 466 input either manually or based on a chosen ruleset 405 which is input at the outset; and the feedback from auditable event history 472. An illustrative example might be as follows: where the calculated risk score for a performance entity is higher than the threshold prescribed (i.e., an undesirable condition). Such a condition might be where a performance entity allows their license to collect to expire in the state of Arizona and the supply entity has a rule that prohibits this. As a result, an automated action might be for the system to recall all accounts assigned to that performance entity and to block assignment of any new accounts having debtors from Arizona, with such actions to continue until, and for 30 days after, the performance entity renews its license in Arizona and provides proof (e.g., documentation in the form of a copy of their re-issued Arizona collection license certificate) that compliance has been restored. In this example, all critical data about the entire exception condition would be retained for audit, reporting, and possible incorporation into future risk score calculations. Again, compliance could include whether an entity is licensed to operate in a region, whether past violations preclude the entity from operating in that region, or various other aspects.

Once the compliance risk score is generated, it is weighted against a threshold at 468. If the risk score is lower than the threshold, the system exits at 476 as the entity does not exceed the risk tolerance to the supply entity at this time. If the risk factor is greater than the threshold, notifications and actions 470 must occur, as outlined at FIG. 11. These actions and notifications may depend upon relevant auditable event history 472 and compliance exceptions 425 of the entity and/or prescribed mitigation and action ruleset(s) 474 as discussed previously.

The end result is a determination of whether or not a particular entity may serve the supply entity on a particular account or set of accounts. Compliance standards are automatically tracked using the computer-implemented method of steps and vendors or entities are notified when they may be approaching non-compliance, when they have reached non-compliance, or at any other prescribed time. The supply entity is also notified and may actually be prevented from assigning jobs or accounts to non-compliant entities by the automated analysis solution 4 system until those entities are once again compliant.

The compliance management system 402 as described herein includes an automatic shutoff feature capable of automatically shutting down submissions of debtor accounts to credit collection agencies when compliance is not met. The level of shutoff can vary depending on predetermined threshold levels. As discussed above, compliance may be rated on several factors, including whether or not the collection agency has a license to practice within a specific State. Other factors may include calling habits (e.g., excessive calling tactics) or similar violations which the compliance management system 402 can track.

In one example, a collection agency may have a license to collect in State X expire. This threshold will be detected by the compliance management system 402 at 406 based upon the risk ruleset 405 including such a factor as exceeding the threshold. Placement of accounts in State X to the agency will be automatically shut off. In an instance like this example, the agency may only be shut off from debtors located within State X until the license is renewed. However, in other instances, such as if the agency is accused of excessive calling of debtors, the entire agency's placement may be suspended for a time period, or placed on "hold."

If an agency is placed on "hold," no new debtor accounts will be distributed to that collection agency for a period of time. The agency may continue to work on counts already assigned to it. The agency can be removed from this suspended basis if the client creditor requests it, or if the agency's risk score drops below the threshold.

A third situation, such as the position above where the collection agency loses its license in State X, would result in a recall of all affected debtor accounts to be reallocated to other agencies. In such a situation, if the agency has been unable to reinstate its license in State X within a time period, all accounts located in State X will be recalled, placed back into the compliance and allocation engines discussed above, where those accounts will be redistributed to new collection agencies. Because accounts are placed with the collection agency best suited to handle those accounts, the recall option is not preferred, and is avoided if possible.

In order to incorporate the threshold score within the compliance management system 402, data must be recorded from each collection agency. As discussed, this could include call logs to determine the calling habits of the agency. Other data collected may include disclosure letters sent by the agencies, individual collector licenses, or other legal or preferred requirements. Each creditor may establish their own threshold requirements based upon their own personal preferences and interpretations of the law(s).

In a preferred embodiment, this compliance management system 402 would run an audit of each credit collection agency account daily and flag accounts in violation. As described above and in FIG. 11, the system will flag accounts needing manual action, but will automatically apply appropriate shutoff routines to those accounts which do not require manual intervention.

It should be noted that violations could be weighted differently, and some violations may never result in recall despite their combined risk score vs. the threshold level.

Another concept generally associated with the compliance management system 402 as well as the debt collection enhancement system 302, including the allocation process 353, is the concept of thresholding. This concept can be incorporated at any step taken by the systems, but may be most appropriate during the allocation process 353.

For example, the allocation of debtor accounts to credit collection agencies is ideally based upon the factors described herein, and those collection agencies who are the best performers against a specific type of debt based upon external factors (e.g., geography) would be assigned that debt. However, in the real world, collection agencies have not been operating on such a model, and therefore presently operate on different scales. Therefore, the number of collection agents an agency has on staff is a value that must be considered.

In an instance where Agency A performs better on a specific type of account than Agency B, but Agency B has twice the staff allotted for working on that type of account, Agency B will necessarily be given at least some of those accounts because Agency A cannot meet the real world demand. However, the model suggests that Agency A be pushed to hire additional credit agents for collecting that specific type of account over time, thereby taking accounts away from Agency B.

The score of each agency must be tracked over time as collection agents have a high turnover, and as agencies hire additional agents, their scores may change. Therefore it is not desirable to quickly adjust the size of Agency A to meet the demand in the example above, as that could cause Agency B to out-perform Agency A due to the new hires. The adjustment should be gradual and measured carefully. A Resource Allocation Threshold limits the volume change of an agency based upon the thresholding performance. In most instances, the creditor will tell the system how fast the threshold can move (e.g., 1% change per month).

Variance also comes into play in these scenarios. In the example above, if the score of Agency A and Agency B differs by a small amount (e.g., 0.1%), then there would not be an immediate desire to push accounts from Agency A to Agency B; however, because multiple variable types are taken into consideration, the system will drill down further into the data to make sure that special subsets of those accounts are going to the better agency. An example of this may be a certain nationality located within a certain geographic area.

Generally, the present invention provides an automated system, through the use of hardware, software, or some combination thereof. The system identifies problems and either corrects those problems, eliminates the problems or problematic entities (e.g., performance entities exceeding a risk score threshold), or calls upon manual intervention to correct problems.

It is to be understood that while certain embodiments and/or aspects of the invention have been shown and described, the invention is not limited thereto and encompasses various other embodiments and aspects. The preferred and alternative embodiments outlined herein are examples of two ways to practice the present invention, but are not intended to limit the practice of the present invention in any way.

The invention claimed is:

1. One or more non-transitory computer-readable media storing computer-executable instructions that, when executed by a processor, perform a method of allocating debt collection accounts among collection parties, the method comprising the steps of:
    receiving an input data file including at least one debt collection account, said debt collection account having at least one account trait;
    determining, for a collection party, at least one performance trait for the collection party;
    allocating the at least one debt collection account to the collection party based at least in part on the account trait of the debt collection account and the performance trait of the collection party;
    receiving a compliance data file including compliance data for the collection party, the compliance data file assessing compliance by the collection party with at least one compliance standard;
    based on the compliance data for the collection party and at least one risk rule, generating a risk score for the collection party, the risk score representing a likelihood of compliance violations;
    if the risk score for the collection party exceeds a predetermined threshold, generating a reallocation data file reallocating the debt collection account allocated to the collecting party based on at least one intervention rule for reducing the risk score; and
    reallocating the at least one debt collection account based on the reallocation data file.

2. The computer-readable media of claim 1, wherein the step of allocation is based on a statistical model selected from the set consisting of naive Bayesian analysis, a regression model, a decision tree, and cluster analysis.

3. The computer-readable media of claim 1, wherein the at least one account trait is a type of credit extended to a debtor associated with the debt collection account.

4. The computer-readable media of claim 1, wherein the at least one account trait is a collection attempt number associated with the debt collection account.

5. The computer-readable media of claim 1, wherein the at least one account trait is selected from the set consisting of a debt amount associated with the debt collection account and a location of a debtor associated with the debt collection account.

6. The computer-readable media of claim 1, wherein the at least one account trait is an ability to pay of a debtor associated with the debt collection account.

7. The computer-readable media of claim 1, wherein the method further comprises the step of elimination the collection party from future debt collection account allocations if the risk score for the collection party exceeds the predetermined threshold.

8. A system for allocating debt collection accounts among collection parties, comprising:
   a first data database storing debt collection account data for a plurality of debt collection accounts, said debt collection account data including at least one account trait for each of said plurality of debt collection accounts;
   a second database storing collection party performance data and collection party compliance data for a plurality of collection parties,
      wherein the collection party performance data includes at least one collection party performance trait for each of the plurality of collection parties,
      wherein the collection party compliance data assesses compliance by each collection party of the plurality of collection parties with at least one compliance standard;
   a first non-transitory computer readable medium storing computer-executable instructions that, when executed by a processor, perform a method of allocating debt collection accounts among collection parties, comprising the steps of:
      accessing the first database to retrieve the at least one account trait for a debt collection account of the plurality of debt collection accounts;
      accessing the second database to retrieve least the at least one collection party performance trait for each of the plurality of collection parties;
      determining a collection party for the debt collection account, based at least in part on the at least one collection party performance trait for the collection party and the at least one account trait for a debt collection account; and
      allocating the debt collection account to the collection party; and
   a second non-transitory computer readable medium storing computer-executable instructions that, when executed by a processor, perform a method of allocating debt collection accounts among collection parties, comprising the steps of:
      accessing the first database to retrieve compliance data for the collection party;
      based on the compliance data for the collection party and at least one risk rule, generating a risk score for the collection party, the risk score representing a likelihood of compliance violations;
      if the risk score for the collection party exceeds a predetermined threshold, generating a reallocation for the debt collection account allocated to the collecting party based on at least one intervention rule for reducing the risk score; and
      reallocating the at least one debt collection account based on the reallocation.

9. The system of claim 8, wherein the first database and the second database are a same database.

10. The system of claim 8, wherein the first computer-readable media and the second computer-readable media are a same computer-readable medium.

11. The system of claim 8, wherein the at least one risk rule is stored in a third database storing a plurality of rusk rules.

12. The system of claim 8, further comprising a third database storing external macroeconomic data.

13. The system of claim 8, further comprising a third database storing external supply data.

14. The system of claim 8, further comprising a third database storing external action data.

15. A method of allocating debt collection accounts among collection parties, the method comprising the steps of:
   receiving an input data file including at least one debt collection account, said debt collection account having at least one account trait;
   determining, for a collection party, at least one performance trait for the collection party;
   for the at least one debt collection account, allocating the debt collection account to the collection party, based at least in part on the account trait of the debt collection account and the performance trait of the collection party;
   receiving a compliance data file including compliance data for the collection party, the compliance data file assessing compliance by the collection party with at least one compliance standard;
   based on the compliance data for the collection party and at least one risk rule, generating a risk score for the collection party, the risk score representing a likelihood of compliance violations;
   if the risk score for the collection party exceeds a predetermined threshold, generating a reallocation data file reallocating the debt collection account allocated to the collecting party based on at least one intervention rule for reducing the risk score; and
   reallocating the at least one debt collection account based on the reallocation data file.

16. The method of claim 15, wherein the at least one performance trait for the collection party is a cost of services associated with the collection party.

17. The method of claim 15, wherein the wherein the at least one performance trait for the collection party is a location associated with the collection party.

18. The method of claim 15, wherein the at least one performance trait for the collection party is a past performance of the collection party.

19. The method of claim 15, wherein the at least one performance trait for the collection party is a size of the collection party.

20. The method of claim 15, wherein the at least one performance trait for the collection party is a resource utilization of the collection party.

* * * * *